United States Patent
Kim et al.

(10) Patent No.: US 7,438,659 B2
(45) Date of Patent: Oct. 21, 2008

(54) DEVICE FOR CONTROLLING BELT LUBRICATION AND COOLING OF CVT (CONTINUOUSLY VARIABLE TRANSMISSION)

(75) Inventors: Yeon Ho Kim, Suwon (KR); Hyun Suk Kim, Hwaseong (KR); Doo Hwan Seok, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 657 days.

(21) Appl. No.: 10/975,129

(22) Filed: Oct. 27, 2004

(65) Prior Publication Data
US 2005/0096164 A1   May 5, 2005

(30) Foreign Application Priority Data
Oct. 30, 2003   (KR)   ........... 10-2003-0076462

(51) Int. Cl.
F16H 57/04 (2006.01)
F16H 57/00 (2006.01)
F16N 7/16 (2006.01)

(52) U.S. Cl. ............... 474/91; 474/92; 474/93; 251/250; 184/15.2; 476/8

(58) Field of Classification Search .......... 474/91, 474/93; 74/467, 468; 476/2, 8, 9; 184/6.26, 184/6.19, 6.12, 15.2; 251/250; 239/569, 239/583

See application file for complete search history.

(56) References Cited

U.S. PATENT DOCUMENTS

| | | | |
|---|---|---|---|
| 3,168,901 A * | 2/1965 | Murakami | 137/492 |
| 4,781,658 A * | 11/1988 | Takano et al. | 474/91 |
| 4,838,485 A * | 6/1989 | Rinkewich | 239/70 |
| 5,033,989 A * | 7/1991 | Shimaguchi | 474/8 |
| 5,309,934 A * | 5/1994 | Jaeger | 137/1 |
| 5,605,513 A * | 2/1997 | Van Der Hardt Aberson | 474/43 |
| 5,800,299 A * | 9/1998 | Lamers et al. | 474/45 |
| 5,901,716 A * | 5/1999 | Hwang et al. | 134/25.4 |
| 5,997,431 A * | 12/1999 | Vukovich et al. | 477/48 |
| 6,010,080 A * | 1/2000 | Marchand et al. | 239/172 |
| 6,053,423 A * | 4/2000 | Jacobsen et al. | 239/18 |
| 6,537,166 B1 * | 3/2003 | Adriaenssens et al. | 474/8 |
| 6,626,781 B2 * | 9/2003 | Van Der Kamp et al. | 474/91 |
| 7,125,355 B2 * | 10/2006 | Schmidt et al. | 474/91 |
| 2002/0013189 A1 | 1/2002 | Van Der Kamp et al. | |
| 2003/0019949 A1 * | 1/2003 | Solie et al. | 239/172 |

FOREIGN PATENT DOCUMENTS

| | | |
|---|---|---|
| EP | 1188957 A1 | 3/2002 |
| JP | 61-041068 | 2/1986 |
| JP | 04-060251 | 2/1992 |
| KR | 1020000004901 A | 1/2000 |

* cited by examiner

Primary Examiner—Robert A. Siconolfi
Assistant Examiner—Thomas W Irvin
(74) Attorney, Agent, or Firm—Morgan Lewis & Bockius LLP

(57) ABSTRACT

A device for controlling belt lubrication and cooling of a CVT (Continuously Variable Transmission) is improved for minimizing fluid consumption and improving cooling efficiency by changing the nozzle spraying direction for belt lubrication and cooling. The device for controlling belt lubrication and cooling of the CVT (Continuously Variable Transmission) comprises a fluid control portion operated by flowing of a fluid pressure supplied to a primary pulley and a secondary pulley, and a fluid supply portion for controlling a predetermined fluid supply according to movement of the fluid control portion and being connected to the same.

3 Claims, 3 Drawing Sheets

DEVICE FOR CONTROLLING BELT LUBRICATION AND COOLING OF CVT (CONTINUOUSLY VARIABLE TRANSMISSION)

CROSS-REFERENCE TO RELATED APPLICATIONS

This application claims priority of Korean Application No. 10-2003-0076462, filed Oct. 30, 2003, the disclosure of which is incorporated herein by reference.

FIELD OF THE INVENTION

Generally, the present invention relates to a device for controlling belt lubrication. More particularly, the present invention relates to a device for controlling belt lubrication and cooling of a CVT (Continuously Variable Transmission).

BACKGROUND OF THE INVENTION

Generally, heat from a CVT (Continuously Variable Transmission) occurs because of friction generated by slippage between the pulley and belt. To cool the heat effectively, ATF (Automatic Transmission Fluid) is sprayed to a belt through a nozzle. One method is applied in which the ATF is sprayed at a belt entrance of a second pulley of the CVT, and another method is applied in which the ATF is simultaneously sprayed at a belt entrance of a primary pulley and the second pulley of the CVT during vehicle movement.

In the case of using the former method, a problem can occur in that the primary pulley may not be cooled enough, and in the case of using the latter method, another problem can occur in that the transmission efficiency is decreased because of excessive consumption of the ATF.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide a device for controlling belt lubrication and cooling of a CVT (Continuously Variable Transmission) having non-limiting advantages of controlling ATF spraying.

An exemplary device for controlling belt lubrication and cooling of the CVT (Continuously Variable Transmission) according to an embodiment of the present invention includes a fluid control portion operated by flowing a fluid pressure supplied to a primary pulley and a secondary pulley, and a fluid supply portion for controlling a predetermined fluid supply according to movement of the fluid control portion and connected to the same.

In a further embodiment, the device for controlling belt lubrication and cooling of the CVT (Continuously Variable Transmission) comprises a shift ratio detecting portion for detecting a shift ratio of the CVT, a control portion for minimizing fluid consumption and improving cooling efficiency by way of analyzing signals inputted from the shift ratio detecting portion and providing a predetermined fluid supply controlling signal for lubricating and cooling belt according to the shift ratio of the CVT, and a fluid supply portion for controlling a predetermined fluid supply by way of movement by a fluid supply controlling signal inputted from the control portion.

In a further alternative embodiment of the invention, a control portion is configured for generating a signal representative of the CVT shift ratio, and a fluid supply portion communicates with the control portion. The fluid supply portion includes a fluid nozzle positionable in response to the signal to direct a cooling fluid alternately at the primary pulley or the secondary pulley of the CVT.

In another alternative, the control portion comprises a valve having a vale housing with a primary port communicating with primary pressure acting on the primary pulley of the CVT and a secondary port communicating with secondary pressure acting on the secondary pulley of the CVT. The ports are positioned on opposite sides of a valve spool, with the valve spool being moveable in response to pressure acting through the ports. A control rod cooperates with the valve spool and the signal is a mechanical signal transmitted though the control rod in response to the position of the valve spool.

In such an embodiment, the fluid supply portion may further comprise a pinion gear cooperating with a first end of the fluid nozzle for rotation thereof, and a gear rack meshed with the pinion gear and cooperating with the control rod for movement in response the signal.

In yet another alternative embodiment, the control portion comprises a shift ratio detector configured to generate a first electronic signal representative of the CVT shift ratio, and processor means communicating with the shift ration detector. The processor may be programmed to analyze the first signal and provide a second control signal indicating lubrication of the CVT belt alternately at the CVT primary or secondary pulley.

In this embodiment, the fluid supply portion may further comprise an electric motor cooperating with the fluid nozzle to rotate the nozzle. The motor may receive the second control signal for control of the rotation. A gear train may be disposed between the fluid nozzle and the motor.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Embodiments of the present invention will hereinafter be described in detail with reference to the accompanying drawings. In general, according to the present invention, controlling belt lubrication and cooling of a CVT (Continuously Variable Transmission) is improved for minimizing fluid consumption and improving cooling efficiency by changing the spraying direction of a nozzle in belt lubrication and cooling.

Figure 1:
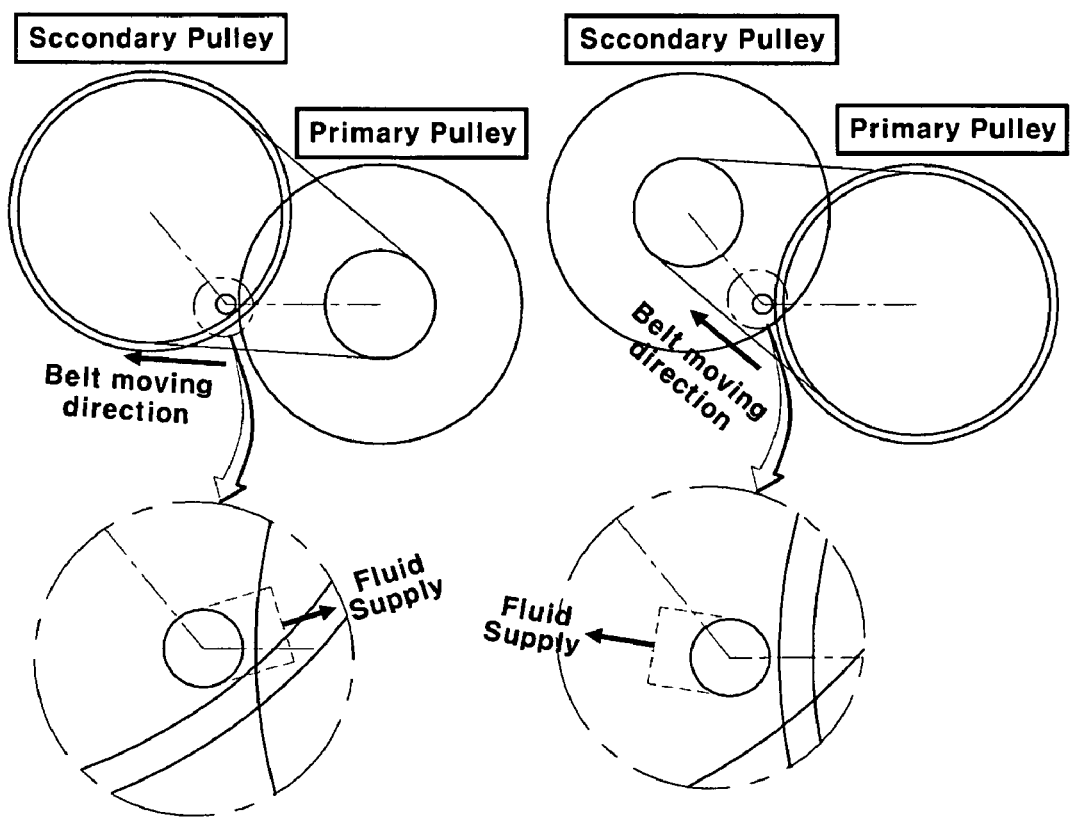
FIG. 1 is a simplified schematic diagram illustrating a device for controlling belt lubrication and cooling of a CVT (Continuously Variable Transmission) according to an embodiment of the present invention.

As shown in FIG. 1, when the shift ratio is low, high heat is generated at the primary pulley, so cooling fluid is sprayed to the primary pulley through a nozzle. When the shift ratio is high, high heat is generated at the secondary pulley, so the cooling fluid is sprayed to the secondary pulley through the nozzle. The nozzle direction may be automatically adjusted by controlling a spool valve of a valve body.

Figure 2A:
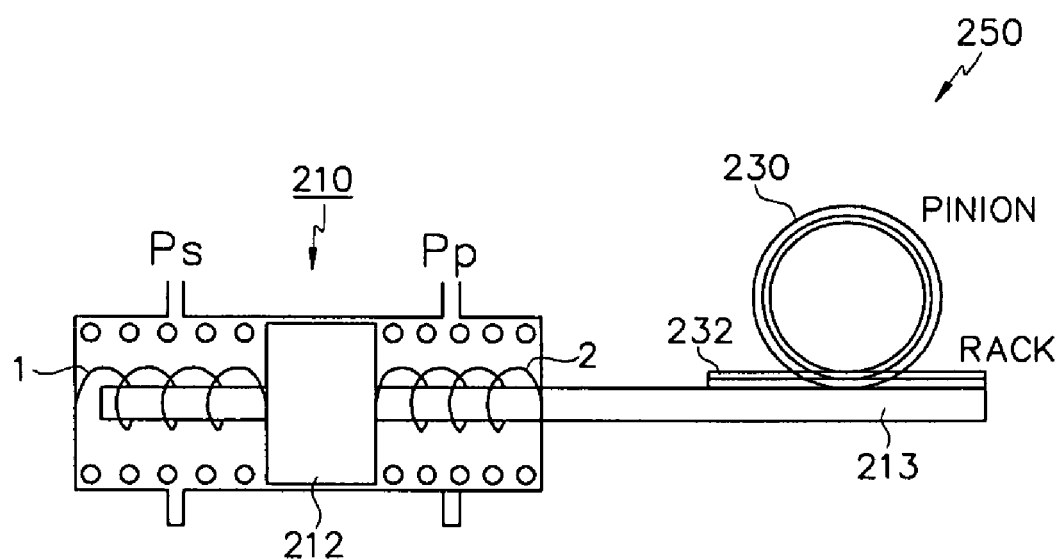
FIGS. 2a and 2b are schematic side and top views, respectively, of a device for controlling belt lubrication and cooling of a CVT (Continuously Variable Transmission) according to a first preferred embodiment of the present invention.
Figure 2B:
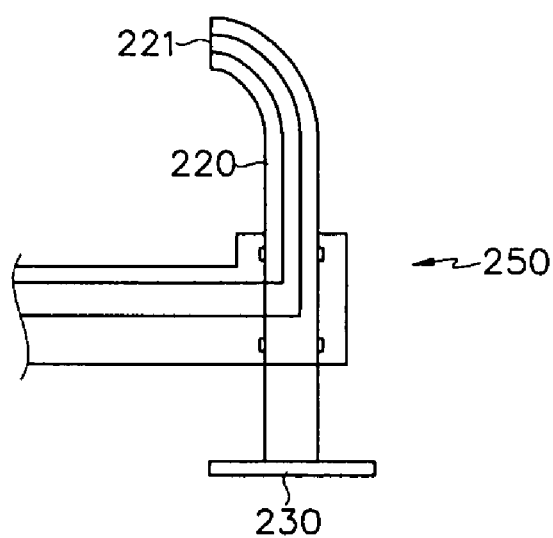

As shown in FIG. 2, according to a first preferred embodiment of the present invention, the device for controlling belt lubrication and cooling of the CVT includes a fluid control portion 210 and a fluid supply portion 250. The fluid control portion 210 includes a spool valve operated by pressure of fluid supplied to the primary pulley and the secondary pulley. The spool valve is additionally mounted in a valve body.

As shown in FIG. 2, the spool valve includes a Pp (Primary port), a Ps (secondary Port), a first spring 1, a second spring 2, and a valve-spool 212. Movement of the valve-spool 212 is operated by the flowing of the fluid pressure supplied to the primary pulley and the secondary pulley.

The fluid supply portion 250, connected to one end of the fluid control portion 210, controls a predetermined fluid supply according to operation of the fluid control portion 210. The fluid supply portion 250 includes a nozzle 220 including a fluid exhausting hole 221 and a direction-adjusting portion for changing the spraying direction of the nozzle 220. Fluid may flow into nozzle 220 through a suitable coupling means from a supply line in order to permit rotation of nozzle 220. Nozzle 220 also may be supported by bearings.

The direction-adjusting portion includes a first gear 230 and a second gear 232. The first gear 230 is connected to one end of the nozzle 220, and the second gear 232 is connected to the valve-spool 212 via shaft 213 for transmitting movement of the valve-spool 212 to the first gear 230. The first gear 230 is formed as a pinion and the second gear 232 is formed as a rack for converting a rectilinear movement of the spool into a rotatory movement of the first gear 230.

If the fluid is supplied to the Pp, the valve-spool 212 is moved in a leftward direction by a pressure of the fluid on the FIG. 2. Therefore, the second gear 232 is also moved in the leftward direction and the spraying direction of the nozzle 220 is changed by rotating the first gear 230.

In addition, if the fluid supplied to the Pp is reduced, the first spring 1 pushes the valve-spool 212 for moving it to an original position.

If the fluid is supplied to the Ps, the valve-spool 212 is moved in a rightward direction by a pressure of the fluid on the FIG. 2. Therefore, the second gear 232 is also moved in the rightward direction and the spraying direction of the nozzle 220 is changed by rotating the first gear 230 in the contrary direction of when the fluid is supplied to the Pp.

In addition, if the fluid supplied to the Ps is reduced, the second spring 2 pushes the valve spool 212 for moving it to the original position.

As described, according to a first preferred embodiment of the present invention, the spool valve which determines the pressure supplied to the primary and the secondary pulley is additionally mounted to the valve body. Therefore, an optimal fluid supply is controlled by an angle of the fluid exhausting hole of the nozzle 220 which is changed by the pressure supplied to the primary and secondary pulley.

As described above, according to a first preferred embodiment of the present invention, a fluid of effective coolant is supplied in the CVT by position control of the spool valve, so fluid consumption and a capacity of an oil pump can be reduced and durability of the belt can be improved.

Figure 3:
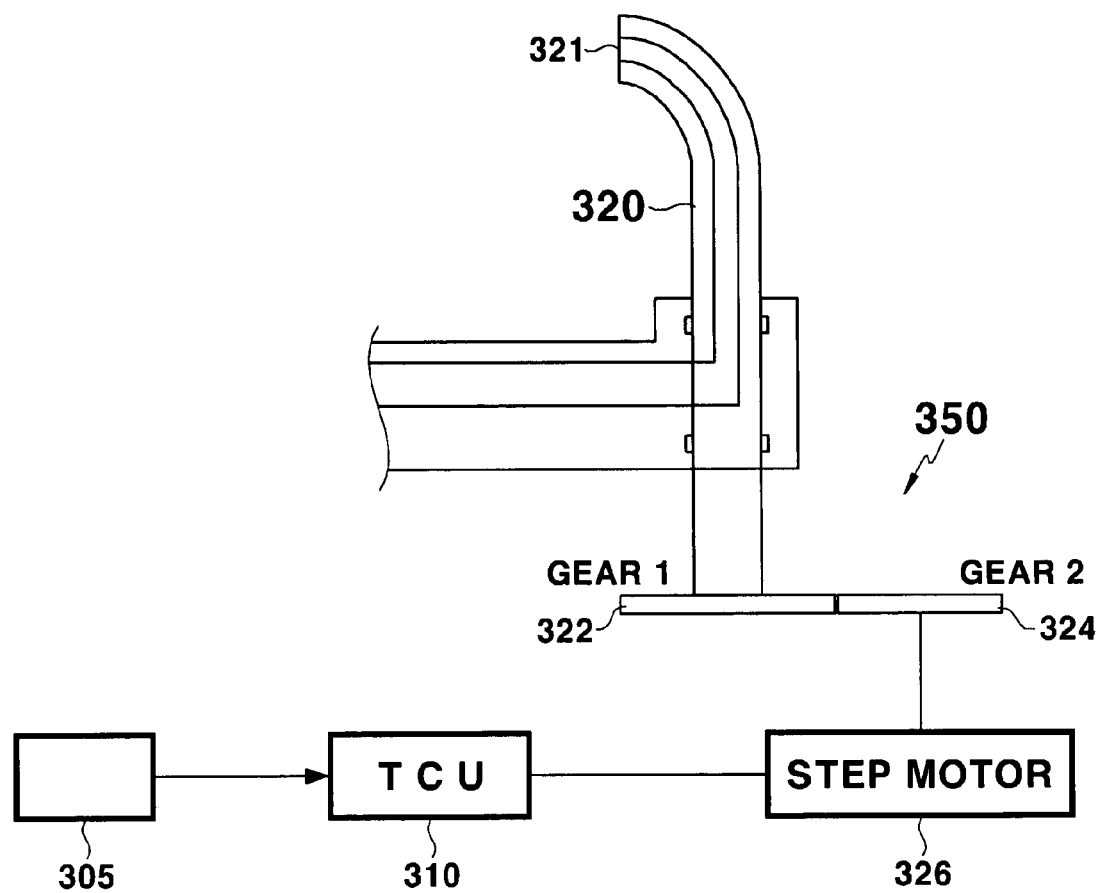
FIG. 3 is a schematic view of a device for controlling belt lubrication and cooling of a CVT (Continuously Variable Transmission) according to a second preferred embodiment of the present invention.

As shown in FIG. 3, according to a second preferred embodiment of the present invention, the device for controlling belt lubrication and cooling of the CVT includes a shift ratio detecting portion 305, a control portion 310, and a fluid supply portion 350. The shift ratio detecting portion 305 detects a shift ratio of the CVT and generates a signal representative thereof. The control portion 310 includes a TCU (Transmission Control Unit). The TCU operates a control motion for improving cooling efficiency and minimizing fluid consumption by analyzing a signal input from the shift ratio detecting portion, and outputting a predetermined fluid supply controlling signal for belt lubrication and cooling according to the shift ratio. The TCU may comprise a processor and associated hardware and software or firmware as may be selected and programmed by a person of ordinary skill in the art based on the teachings herein.

For example, the control portion 310 analyzes the signal inputted from the shift ratio detecting portion, and then, if the shift ratio is low, the control portion 310 outputs a primary fluid supply controlling signal for spraying the cooling fluid to the primary pulley. In addition, the control portion 310 analyzes the signal input from the shift ratio detecting portion, and then, if the shift ratio is high, the control portion 310 outputs a secondary fluid supply controlling signal for spraying the cooling fluid to the secondary pulley.

The fluid supply portion 350 controls a predetermined fluid supply according to the fluid supply controlling signal input from the control portion 310. The fluid supply portion 350 includes a nozzle 320 including a fluid exhausting hole 321 and a direction-adjusting portion for changing a spraying direction. Once again, appropriate support bearings and fluid connection to a fluid supply may be provided by a person skilled in the art.

The direction adjusting portion includes a first gear 322, a second gear 324, and a step motor 326. The first gear 322 is formed as a spur gear connected to one end of the nozzle 320 and the second gear 324 is formed as a spur gear connected to the first gear 322.

The step motor 326 is operated by the fluid supply controlling signal input from the control portion 310, and transmits a rotatory power to the second gear 324. The second gear 324 transmits the rotatory power to the first gear 322. Therefore, the spraying direction of the fluid exhausting hole 321 of the nozzle 320 secured to the first gear 322 is changed.

As described thereof, according to a second preferred embodiment of the present invention, the step motor 326 is operated by the fluid supply controlling signal inputted from the control portion 310, and the step motor 326 changes an angle of a fluid exhausting hole of the nozzle 320.

Therefore, an optimal fluid supply is controlled by changing an angle of the fluid exhausting hole of the nozzle 320.

As described, according to a second preferred embodiment of the present invention, a fluid of effective coolant is supplied in the CVT by position control by the step motor 326 according to the control portion 310 thereof, so fluid consumption and a capacity of an oil pump can be reduced and durability of the belt can be improved.

As described, according to an embodiment of the present invention, the device for controlling belt lubrication and cooling of the CVT (Continuously Variable Transmission) improves durability of the same by way of cooling belts and pulleys.

In addition, the device for controlling belt lubrication and cooling of the CVT improves cooling efficiency by minimizing consumption of fluid, and has effectiveness in that a pump which has a small capacity can be applied.

The TCU can be realized by one or more processors activated by a predetermined program, and the predetermined program can be programmed to perform each step of a method according to an embodiment of this invention.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A device for controlling belt lubrication and cooling of a continuously variable transmission (CVT), comprising:
   a control portion configured for generating a mechanical signal representative of the CVT shift ratio; wherein said control portion comprises:
      a valve having a valve housing with a primary port communicating with primary pressure acting on a primary pulley of the CVT and a secondary port communicating with secondary pressure acting on a secondary pulley of the CVT, said ports positioned on opposite sides of a valve spool respectively, said valve spool being moveable in response to pressure acting through said ports; and
      a control rod cooperating with the valve spool, wherein said signal is a mechanical signal transmitted through said control rod in response to a position of said valve spool; and
   a fluid supply portion communicating with said control portion and including a fluid nozzle positionable in response to said mechanical signal to direct a cooling fluid alternately at the primary pulley or the secondary pulley of said CVT, comprising:
      a pinion gear cooperating with a first end of said fluid nozzle for rotation thereof; and
      a gear rack meshed with said pinion gear and cooperating with said control rod for movement in response said mechanical signal.

2. A device for controlling belt lubrication and cooling of a CVT (Continuously Variable Transmission), comprising;
   a fluid control portion comprising a spool and operated by flowing of a fluid pressure difference supplied to a primary pulley and a secondary pulley of said CVT; and
   a fluid supply portion that is connected to the fluid control portion and controls a predetermined fluid supply according to movement of the fluid control portion wherein the fluid supply portion comprises; a nozzle including a fluid exhausting hole; and a direction-adjusting portion for changing a spraying direction of the nozzle wherein the direction-adjusting portion comprises; a first gear connected to one end of the nozzle; and a second gear transmitting a movement of the spool to the first gear and being connected to the spool, wherein the first gear is formed as a pinion, and the second gear is formed as a rack which converts a rectilinear movement of the spool into a rotatory movement of the first gear.

3. The device of claim 2, wherein the fluid control portion, including a primary port and a secondary port, comprises a spool valve in which a valve-spool is operated by flowing of the fluid pressure supplied to the primary pulley and the secondary pulley.

* * * * *